UNITED STATES PATENT OFFICE.

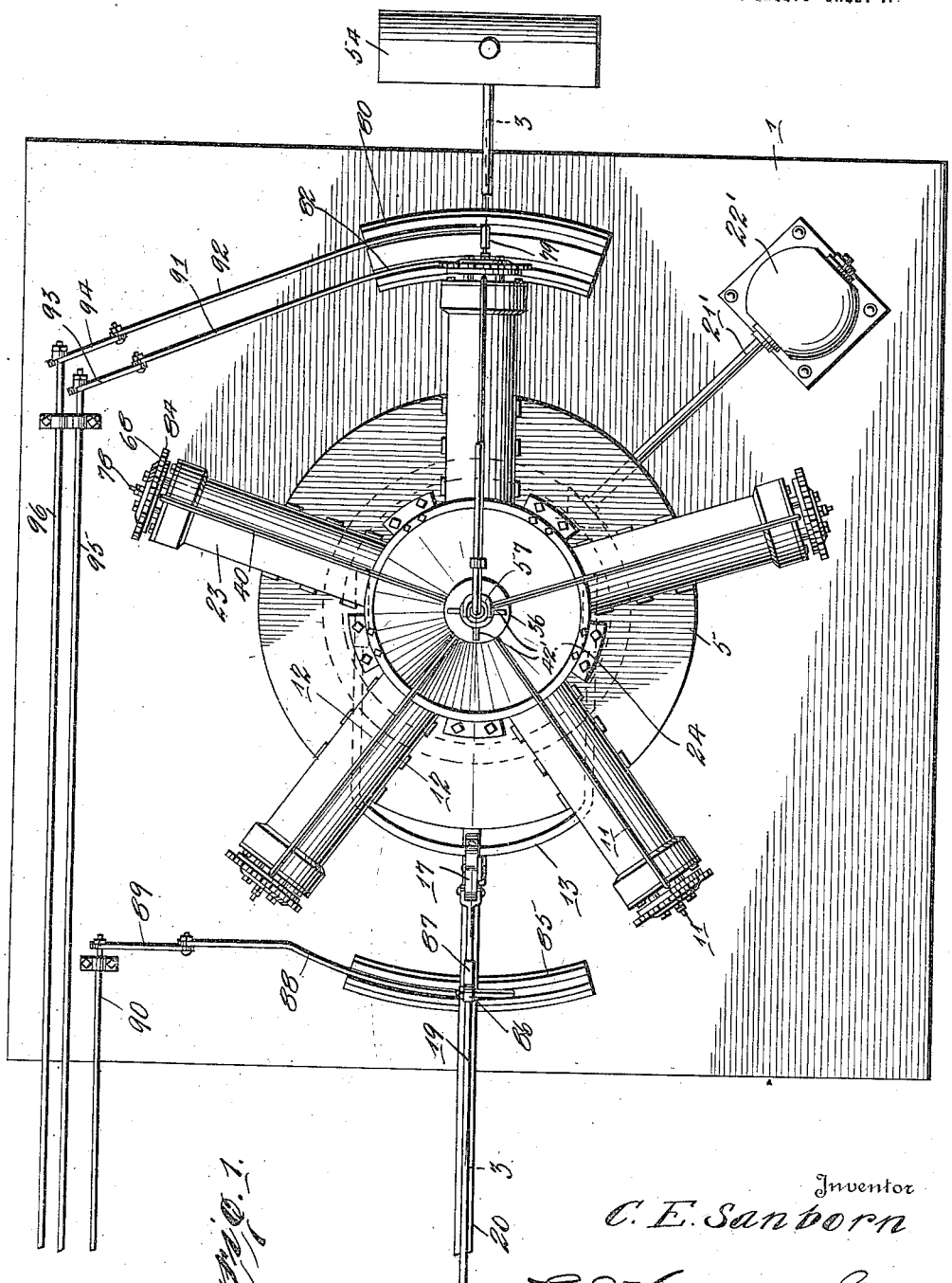

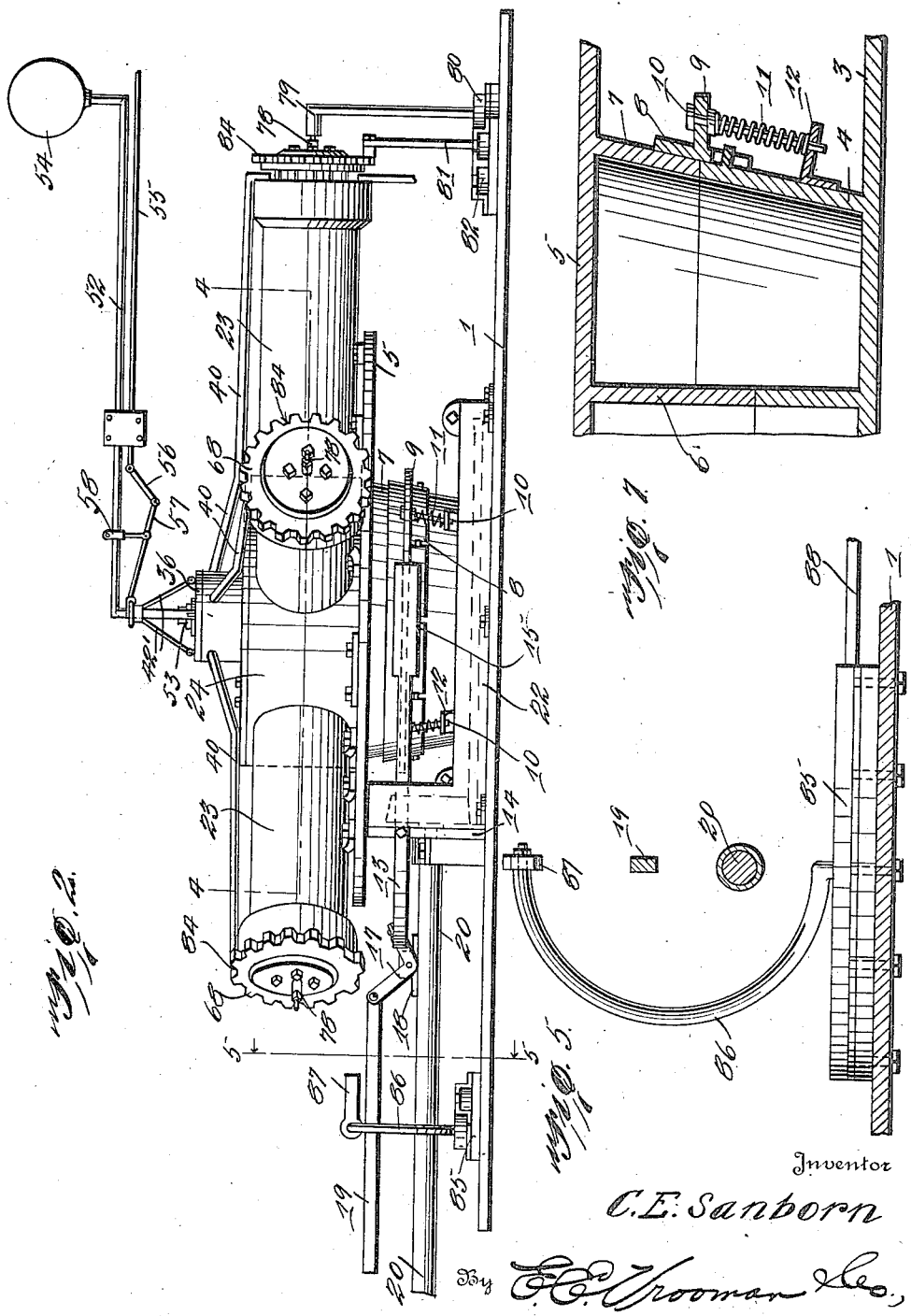

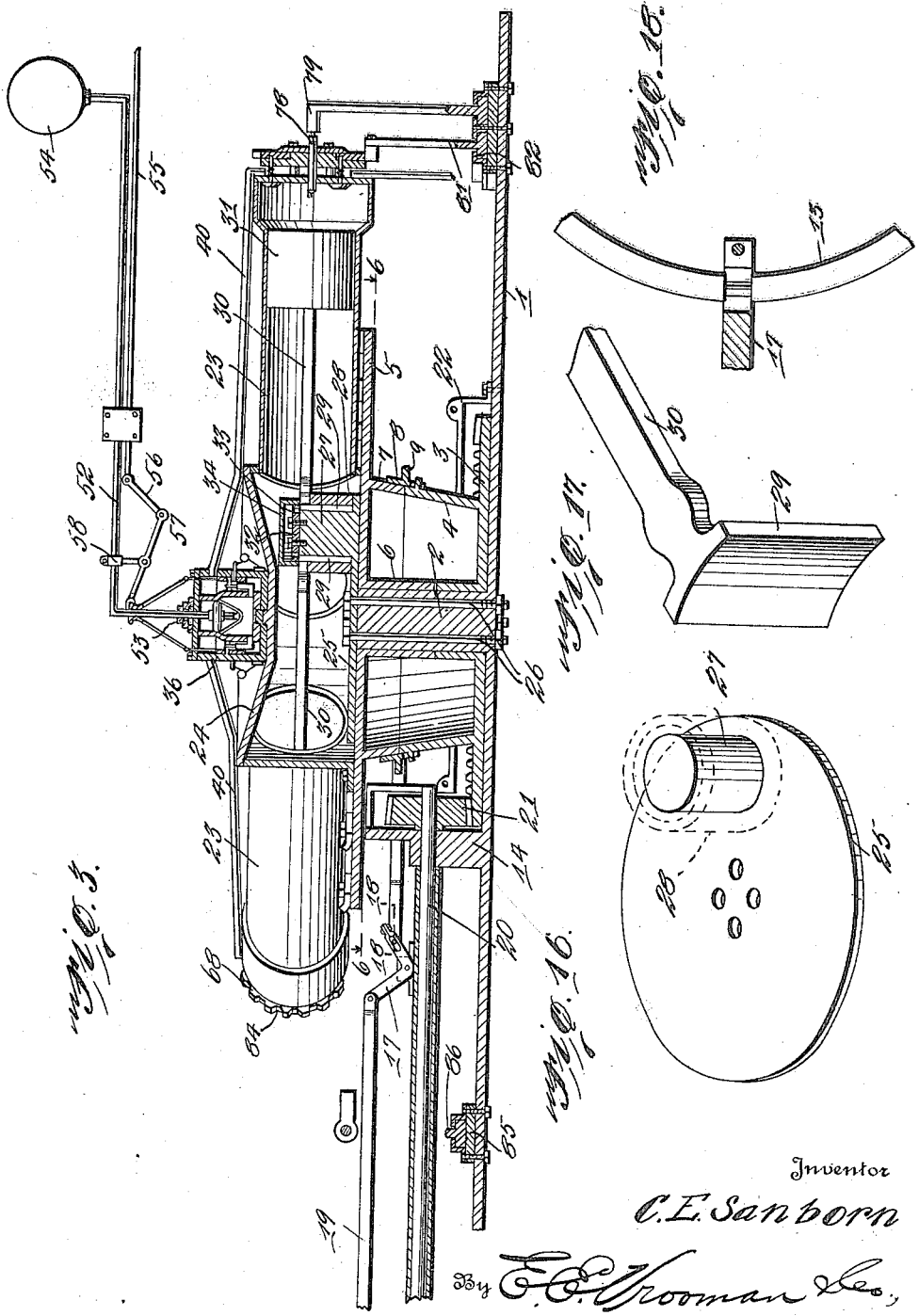

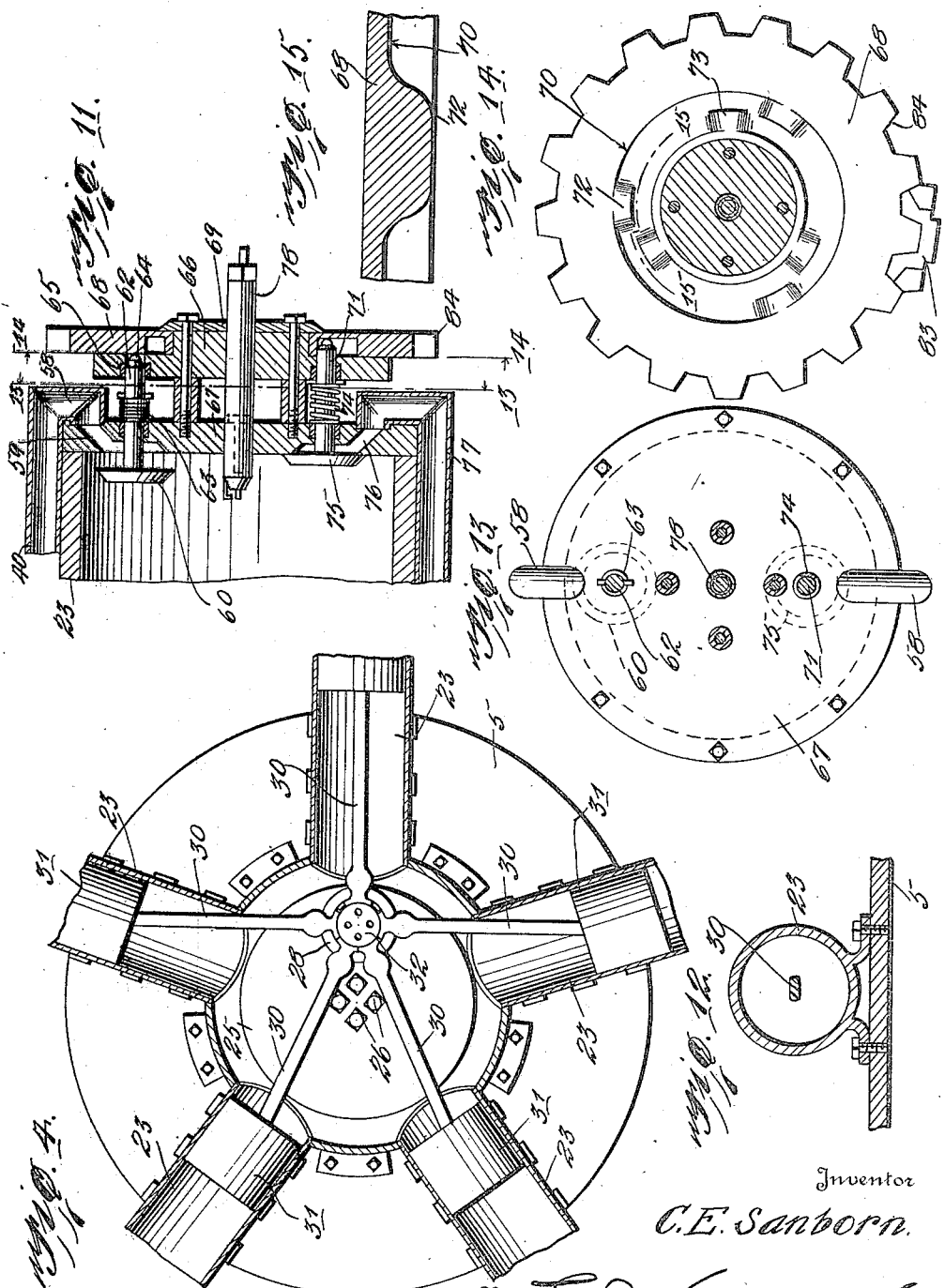

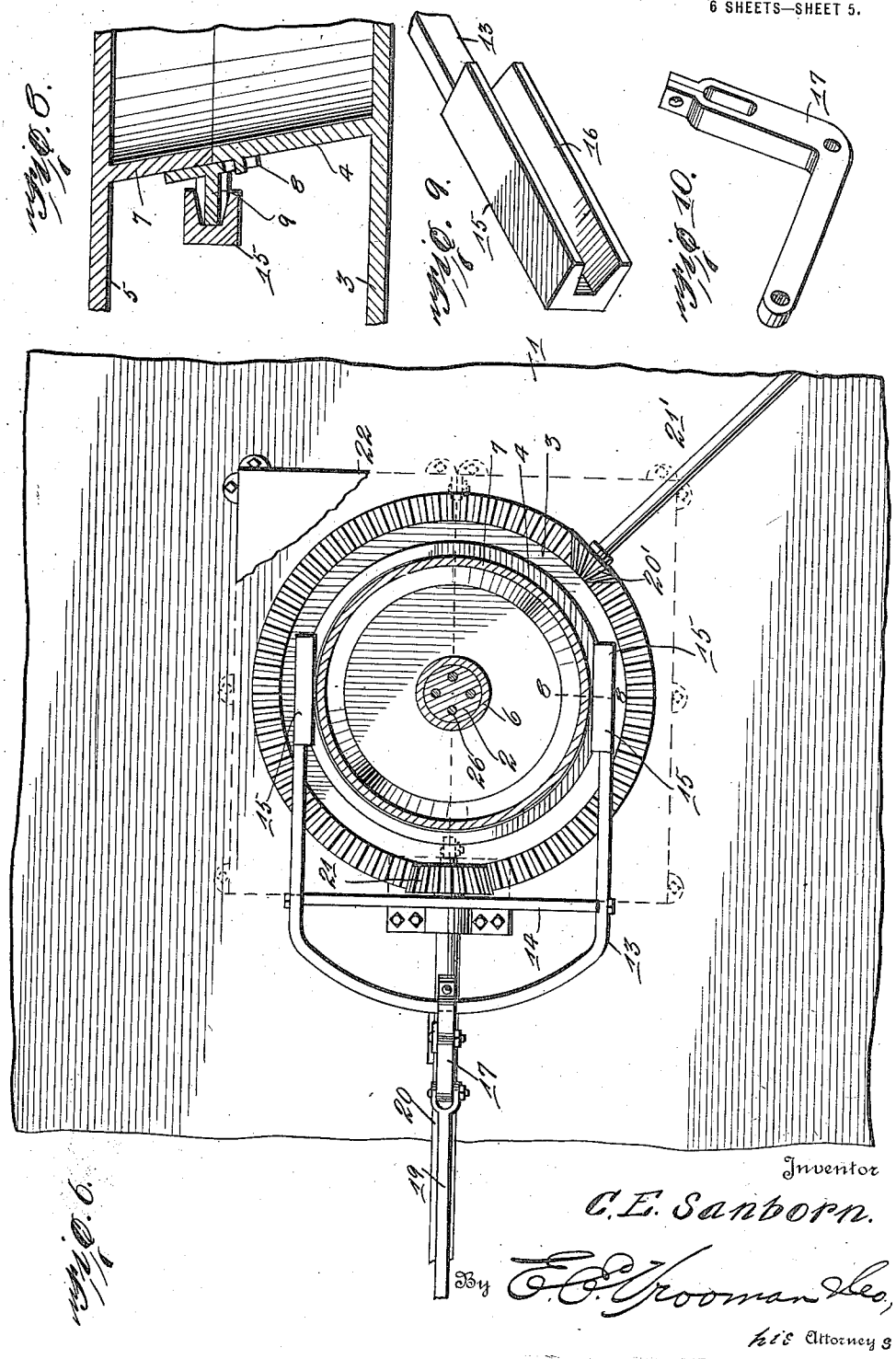

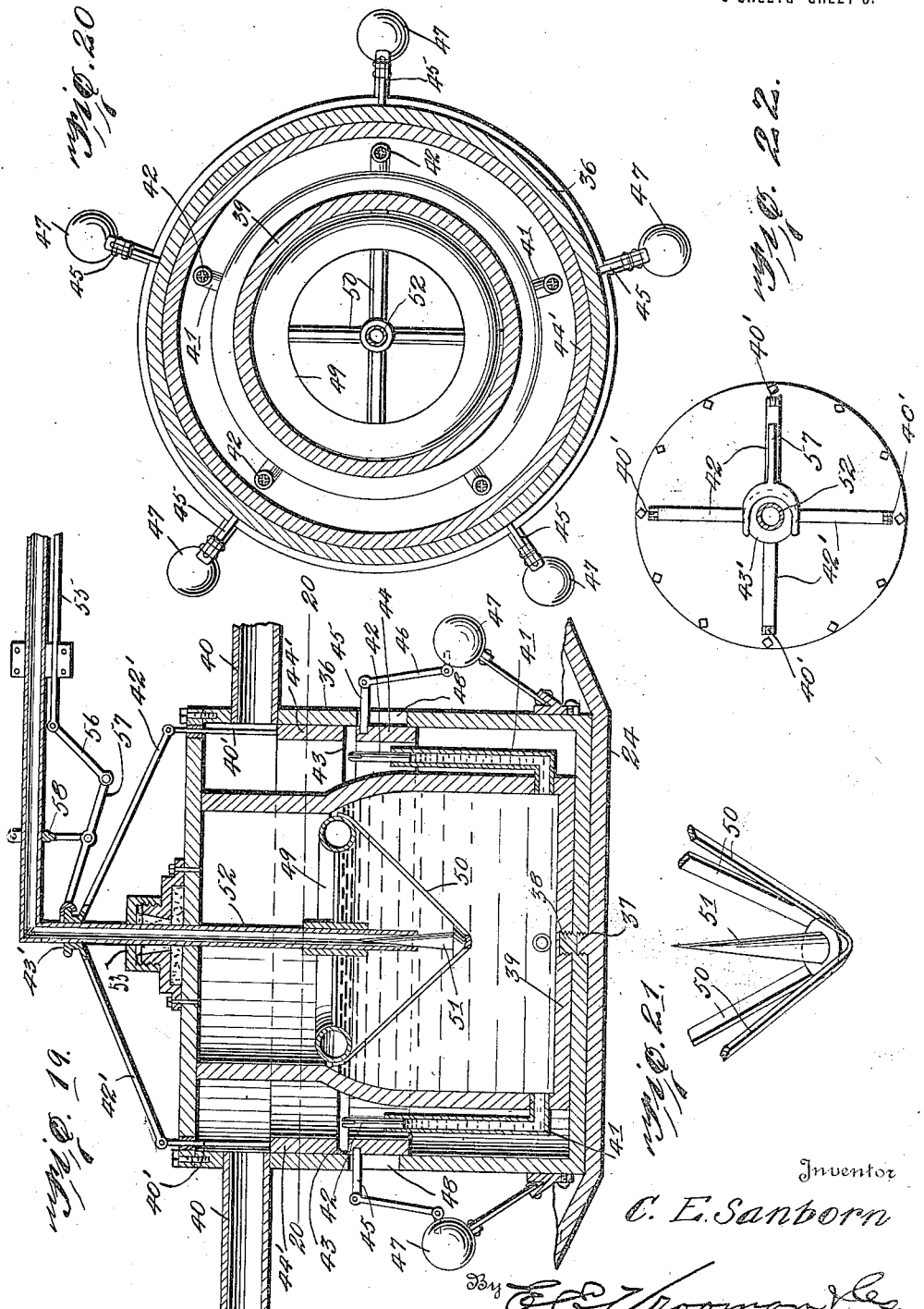

CHARLES E. SANBORN, OF STILLWATER, OKLAHOMA.

ROTARY GAS-ENGINE.

1,293,623.  Specification of Letters Patent.  Patented Feb. 4, 1919.

Application filed March 14, 1917. Serial No. 154,863.

*To all whom it may concern:*

Be it known that I, CHARLES E. SANBORN, a citizen of the United States of America, residing at Stillwater, in the county of Payne and State of Oklahoma, have invented certain new and useful Improvements in Rotary Gas-Engines, of which the following is a specification, reference being had therein to the accompanying drawing.

This invention relates to rotary gas engines and has for its object the production of a simple and efficient engine especially constructed for the propulsion of automobiles and other motor vehicles, although the engine may be put to various other uses.

With this and other objects in view this invention consists in general of certain novel combinations, constructions and arrangements of parts as will be hereinafter fully described and claimed.

In the drawings:—

Figure 1 is a top plan view of the engine.

Fig. 2 is a side elevation thereof.

Fig. 3 is a section taken on line 3—3, Fig. 1.

Fig. 4 is a section taken on line 4—4, Fig. 2.

Fig. 5 is a section taken on line 5—5, Fig. 2.

Fig. 6 is a section taken on line 6—6, Fig. 3.

Fig. 7 is a vertical section taken through the friction clutch showing the springs carried thereby.

Fig. 8 is a section taken on line 8—8, Fig. 6.

Fig. 9 is a perspective view of one end of the friction clutch operating arm.

Fig. 10 is a detail perspective view of the operating bell crank for the friction clutch.

Fig. 11 is a section taken on line 11—11, Fig. 1.

Fig. 12 is a section taken on line 12—12, Fig. 1.

Fig. 13 is a section taken on line 13—13, Fig. 11.

Fig. 14 is a section taken on line 14—14, Fig. 11.

Fig. 15 is a section taken on line 15—15, Fig. 14.

Fig. 16 is a detail perspective view of the crank disk.

Fig. 17 is a detail perspective view of one end of one of the piston rods.

Fig. 18 is a section taken on line 18—18, Fig. 3.

Fig. 19 is a vertical section through the carbureter.

Fig. 20 is a section taken on line 20—20, Fig. 19.

Fig. 21 is a detail perspective view of the lower portion of the valve carried by the carbureter.

Fig. 22 is a top plan view of the carbureter showing the arms for manually controlling the admission of gas to the cylinder.

By referring to the drawings it will be seen that 1 designates the supporting platform which carries a standard 2, upon which standard 2 is rotatably mounted a driving gear 3. This driving gear 3 is provided with an upwardly-extending circumferentially-formed flange 4 which constitutes the lower section of the friction clutch used in connection with the present engine which will be hereinafter clearly described. A base plate 5 is also rotatably mounted upon the standard 2 and is provided with a depending collar 6 fitting snugly around the standard 2, as shown clearly in Fig. 3 of the drawings. This base plate 5 is also provided with a depending annular flange 7 which is adapted to register with the flange 4 and constitutes the upper section of the friction clutch.

A sliding clutch band 8 is mounted upon the upper and lower sections 7 and 4 of the friction clutch and this band is provided with a laterally-extending flange 9, which flange 9 supports a plurality of guiding bolts 10, which bolts 10 carry springs 11, the springs 11 engaging the brackets 12 carried by the lower flange or clutch section 4, and these springs 11 are adapted to normally urge the band 8 into firm engagement with the flange or upper section 7 of the clutch, thereby locking the upper and lower sections of the clutch firmly together.

An operating lever 13 is also employed and is pivotally supported upon the frame 14. This operating lever 13 is substantially yoke-shaped and carries a shoe 15 at each end thereof, which shoe is provided with a substantially V-shaped groove 16 upon the inner face thereof for firmly fitting over the flange 9 of the gripping band 8. It will, therefore, be seen that as the outer end of the lever 13 is elevated, the lower end or shoes 15 of the lever 13 will be pushed downwardly, thereby causing the gripping band 8 to be disengaged from the flange 7. However, as soon as the lever 13 is released the springs 11 will immediately force the band into firm engagement with the clutch section or flange 7.

A bell crank lever 17 which is illustrated in detail in Fig. 10 is pivotally mounted upon the supporting bracket 18 and engages at its inner end the lever 13. An operating link 19 is also secured to the rear end of the lever 17 for the purpose of permitting the lever 13 to be thrown to a position for throwing the clutch band 8 into and out of an operative position.

It, of course, should be understood that any suitable or desired transmission may be employed for connection with the shaft 20 and, as illustrated in the drawings, it will be seen that the shaft 20 carries a bevel gear 21 which meshes with the teeth formed upon the gear 3. This structure is clearly illustrated in Fig. 6 of the drawings. A suitable casing 22 is placed over the gears 3 and 21 to constitute a housing therefor.

A plurality of radiating cylinders 23 are supported upon the base plate 5, as clearly illustrated in Figs. 1 and 3 of the drawings, and these cylinders communicate with a crank casing 24 shown clearly in Fig. 2 of the drawings. A crank pin supporting plate 25 is carried by the standard 2 and is anchored in engagement therewith by means of the anchoring bolts 26. The crank pin supporting plate 25 carries a crank pin 27, around which crank pin 27 fits a collar 28 for retaining the shoes 29 of the piston rods 30. These piston rods 30 engage piston heads 31 at one end thereof and the shoes 29 are so formed as to fit snugly in nested relation around the crank pin 27, at the same time permitting the shoes 29 to move freely around the crank pin 27. The collar 28 will firmly hold these shoes in engagement with the crank pin 27 as is clearly illustrated in Fig. 3 of the drawings. A retaining plate 32 is secured to the upper end of the crank pin 27 and overhangs the shoes 29 of the piston rods 30 as shown in Fig. 3. This plate 32 is provided with suitable lubricating apertures 33 and a lubricating housing 34 fits over the upper end of the crank pin 27, the lubricating apertures 33 permitting the lubricant from the casing 34 to pass down between the crank pin 27 and the shoes 29. It will, therefore, be seen that as the cylinder supporting plate 5 rotates, as will be more clearly hereinafter described, the piston heads 31 will be reciprocated within the cylinders 23 due to the fact that the crank pin 27 is held stationary and is arranged in eccentric relation with respect to the center of the crank casing 24.

It of course should be understood that any suitable or desired number of cylinders may be employed in connection with the present invention although it has been found preferable to employ an odd number, such as five cylinders, as is illustrated in Fig. 2 of the drawings. By employing five cylinders, an even and constant pull will be obtained by the engine, thereby eliminating the uneven pulsations of the engine for the reason that at least one of the cylinders will at all times be exerting a pulling or a driving action upon the crank pin 27.

A carbureter 36 is supported centrally upon the crank casing 24, as is shown in Fig. 3 and in detail in Fig. 19, and it will be seen by carefully considering Fig. 19 that the crank casing 24 is provided with an upwardly-extending threaded lug 37, which threaded lug is threaded into a threaded socket formed in the bottom of the carbureter casing 36. The carbureter casing 36 is in turn provided with a threaded lug 38 which threaded lug is threaded into a threaded socket formed in the bottom of the fuel containing chamber 39. It will, therefore, be seen that the carbureter casing 36 will be anchored upon the crank casing 24 so as to revolve therewith.

The carbureter casing 36 is provided with a plurality of radiating tubes 40, which tubes 40 pass from the carbureter casing 36 to the respective ends of the cylinders 23 for the purpose of supplying fuel from the carbureter to the outer ends of the explosive cylinders 23. Suitable means is of course provided at the ends of the explosive cylinders for the purpose of controlling the admission and exhaust of gases to and from the cylinders, and, at the same time, for controlling the exploding of said gases. This structure will be more clearly described in detail in the following specification.

A fuel containing casing 39 above referred to is seated within the casing 36 and this fuel containing casing 39 is provided with a plurality of upwardly-extending spouts 41, which upwardly-extending spouts 41 have discharge nozzles 42 supported in the upper ends thereof. These discharge nozzles 42 are adapted to discharge fuel from the casing or the housing 39 at a point opposite the air inlet opening 43 formed in the housing 36 and regulated by air control collar 44. This air control collar 44 carries a plurality of outwardly-extending fingers 45, which fingers are connected to governor arms 46 carried by governors 47. The governors 47 are in turn connected at one end to the carbureter casing 36. The arms 45 work through the circular openings 48 formed in the casing 36 and it will be seen that as the speed of the engine increases, the governors 47 will spread outwardly thereby causing the air control 44 to be drawn downwardly and to permit the admission of additional air into the carbureter.

A float 49 is mounted within the fuel chamber 39 and this float 49 carries a plurality of depending brackets 50, which brackets 50 support a valve 51 which valve is substantially conical in shape and extends upwardly into the discharge end of the fuel supply pipe 52. It will, therefore, be seen that the float 49 will permit the fuel within the carbureter to be maintained at a uniform level for the reason that when the fuel falls below a predetermined height within the fuel chamber 39, the conical valve 51 will be drawn out of the discharge end of the fuel supply pipe 52 and permit the fuel to pass down through the tube 52 into the casing 39. If, however, the fuel should rise to a predetermined level, the conical valve 51 will immediately seat itself upon the discharge end of the fuel supply pipe 52 and prevent the further discharge of fuel into the casing 39. By means of the device described and illustrated, it will be seen that an efficient means has been produced for preventing the flooding of the fuel chamber.

By carefully considering Fig. 19 it will be seen that the fuel supply pipe 52 constitutes a bearing for the carbureter and that the carbureter 36 is adapted to revolve around or upon the tube 52. A suitable bearing casing 53 is employed upon the carbureter 36 and is adapted to constitute an efficient journal for the carbureter. It of course should be understood that suitable packing may be employed for the purpose of producing an efficient or convenient journal.

The fuel supply pipe 52 is adapted to pass from a fuel reservoir 54 and it should be understood that this reservoir 54 may be placed upon an automobile or other motor vehicle in any suitable or convenient place, and it is preferable to place the fuel reservoir at a point which is now usually occupied by the radiator in an automobile, thereby removing the fuel supply from a dangerous point under the seat of the operator of the machine. The present engine, of course, will be air cooled, thereby entirely eliminating the necessity of employing water jackets or a radiator. The continual rotation of the engine and the swinging of the cylinders through the air will be sufficient to cause the cylinders to be kept at a proper temperature. A suitable operating lever 55 is also employed and may be operated from any desired or convenient point, and this lever 55 engages a link 56, which link 56 engages a lever 57 suspended upon the hanger 58 carried by the supply pipe 52. The lever 57 is adapted to operate a suitable apparatus for controlling the manual admission of gases from the carbureter through the respective pipes 40, as hereinafter described.

Attention is now particularly called to Figs. 11, 12 and 13 which show in detail the construction of the cylinder heads. It will be seen by carefully considering Fig. 11 that the pipe 40 of each cylinder is provided with an inwardly-turned end 58, which inwardly-turned end 58 communicates with an inlet port 59. This port 59 is adapted to be closed by means of a valve 60 carried by a plunger 62. A suitable coil spring 63 is carried by the plunger 62 and is adapted to normally hold the valve 60 upon its valve seat and close the passage of gases through the port 59. The outer end of the plunger 62 carries a suitable bearing 64 which works through an aperture 65 in the guiding plate 66. This guiding plate is anchored upon the cylinder head 67 as shown in Fig. 11 and a rotating controlling gear 68 is rotatably mounted upon the guiding plate 66. A retaining plate 69 is carried by the guiding plate 66, and this gear 68 is provided with a suitably arranged groove 70 upon the inner face thereof for the purpose of engaging the respective ends of the plungers 62 and 71 of the inlet and exhaust valves. A plurality of lugs 72 and 73 are formed within the pocket 70 for the purpose of causing the plungers 62 and 71 to reciprocate at proper intervals as the gear 68 is rotated. The plunger 71 carries a coil spring 74 for normally holding the plunger 71 in a closed position and a valve 75 is carried by the plunger 71 for normally closing the exhaust port 76 formed in the cylinder head 67. A suitable exhaust pipe 77 is also connected to the cylinder head for conveying the exhaust gases from the cylinder when the port 76 is open.

A spark plug 78 is carried by the guiding plate 66 and extends through the cylinder head 67 and this spark plug is adapted to be engaged by an adjustable contact arm 79 for the purpose of closing an electrical circuit through the spark plug from any suitable or desired source of electrical supply, thereby igniting the gases within the explosive cylinder.

By carefully considering Figs. 1 and 2 it will be seen that this contact arm 79 is slidably mounted within a track-way 80 carried by the platform 1. This track-way 80 is substantially channel-shaped in cross section for receiving a suitable shoe carried by the lower end of the contact arm 79. A tripping rod 81 is supported and slidably mounted upon the track-way 82 and this tripping rod 81 is provided with a tripping head 83 for engaging the teeth 84 of the gear wheel 68.

A similar track-way 85 is supported substantially diametrically opposite the trackways 80 and 82 and a curved arm 86, is slidably mounted therein which is shown in detail in Fig. 5 and is provided with a suitable tripping head 87 for the purpose of rotating the gear wheel 68 a proper distance for opening the exhaust valve 75 and exhaust port 76. The tripping arm 86 is connected to a link 88, which link is in turn connected to a finger 89 carried by a shaft 90. The shaft 90 is suitably operated for the purpose of reciprocating the arm 86 within the trackway 85 and sliding the same to a desired or adjusted position. The arm 86 is curved for the purpose of permitting a proper adjustment notwithstanding the fact that the shaft 20 and link 19 pass across the path of movement of this arm 86.

Suitable links 91 and 92 are also connected to the respective arms 81 and 79 and these links 91 and 92 are in turn connected to fingers 93 and 94 carried by the shafts 95 and 96. These shafts 95 and 96 may be operated in any convenient or desired manner.

It should be, of course, understood that any suitable or desired transmission means may be employed for taking the power from the engine and may be attached in any suitable or desired place upon the engine, as for instance, upon the base plate 5. The attaching of the transmission device, however, to the engine is elementary and it is not thought necessary to go into detail illustration and description of this transmission connection.

It of course should be understood that the lubrication of the engine will be the splash system within the crank casing and that the gyroscopic motion of the engine will aid largely in steadying the automobile or motor-car upon which the device is installed, thereby greatly eliminating the danger of turning turtle at times during which vehicles are turned quickly from a straight course while in high speed, as is present in ordinary engines of the fly-wheel type.

A starting pinion 20' meshes with the gear 3 and this pinion 20' is carried by a shaft 21' which is driven by a starting motor 22'. This motor 22' is especially adapted for the initial starting of the engine.

From the foregoing description it will be seen that a very simple and efficient explosive engine has been produced which is of the air-cooled type and which eliminates many cumbersome parts which are now employed upon engines of like character, thereby greatly reducing the cost of maintenance as well as the installation of the engine.

Suitable reverse gearing is placed on the motor shaft for the purpose of starting the engine on the reverse, but it should be understood that the engine may be as efficiently run reversely as forward, by the shifting of the contact arm 79 and tripping rod 81, also curved arm 86 to their proper relative positions. It should be noted that the dog 83 is so shaped and attached as to permit tripping heads 83 and 87 to rotate gear wheel 68 to advance a certain predetermined fractional distance of its revolution at each contact with the tripping heads 83 and 87. The dog 83 locks the gear wheel 68 and prevents its revolving except through definite action with the tripping heads which at contact unlock and at the time of separation leave dog in such a position as to cause gear wheel to remain perfectly stationary.

It of course should be understood that any suitable exhaust system might be used with the present invention and also that a suitable muffler might also be used without departing from the spirit of the invention. A collar 44' is slidably mounted within the casing 36 and is adapted to manually control the admission of gas through the pipes 40. Rods 40' are carried by the collar 44' and extend through the cover plate of the casing 36 and engage the radiating arms 42' which are carried by a flanged collar 43'. This flanged collar 43' is engaged by the forked end 57' of the lever 57. It should be understood that as the lever 57 is swung, the arms 42' and the rods 40' will be raised or lowered, thereby shifting the collar 44' to an open or closed position.

In my co-pending application Ser. No. 200,534, filed Nov. 6, 1917, I have disclosed the divisional subject-matter divided out of this application, covering my improved carbureter. Gear wheel 68 should have twelve teeth. (Rotating controlling gear.) There are three pairs of plurality lugs 72 and 73. Lug 72 is for the purpose of opening the intake valve. Lug 73 is for the purpose of opening the exhaust valve 75.

When a cylinder is charged with gas and ready to fire at point 79 both valves will be closed because of position of lugs, after firing however and when cylinder is at point 87 tripping head 87 will engage in a sprocket and turn 68 one twelfth of its circumference and lug 73 will compress and open the exhaust valve 75. When cylinder completes its revolution at point 79 the tripping head 83 will engage in sprocket and turn 68 another twelfth of its circumference permitting lug to pass by exhaust valve 75 and at the same time causing lug 72 to compress intake valve 60 thus opening it. The cylinder in passing to point 87 this the second time will become charged with gas by action of piston 31. At point 87 the tripping head 87 will engage and turn 68 a twelfth of its circumference causing intake valve 60 to close. The cylinder will then pass to point 79 where 68 will be again turned a twelfth of its circumference. No action will result on valves since neither lug will be in position to disturb them. Ignition will occur and the process repeated as above shown. This will hold for all cylinders. Electric contact will take place at each revolution of cylinder but actual firing can only take place at every other revolution as above shown.

You will note that dog 83 is explained by me along with the drawings which I submitted. Action is positive and the dog disengages and engages at each action of the tripping rods so that 68 must rotate a certain distance and remain at a certain place each time action occurs.

Now 81 and 85 are adjustable just the same as 80. They have a sliding base which lies in a track curved the radius of which has the center in the crank shaft of the engine. By moving 81 for instance to the right or to the left the time of closing the intake valve may be regulated. The same is true of 85; the opening and closing of the valve can be so regulated as to cause action at any desired point. This adjustment partly is responsible for the running of the engine either forward or reverse.

There are two races extending circularly in 68 through which valve stems protrude except where lugs are shown.

What is claimed is:—

1. An engine of the class described comprising a base, a standard, a cylinder supporting plate rotatably mounted upon said standard, means for rotating said cylinders, a friction clutch coöperating with said cylinder supporting plate, a starting shaft, a gear carried by said friction clutch, and means forming a connection between said starting shaft and gear for rotating said clutch and said cylinder supporting plate.

2. An engine of the class described comprising a base, a standard, a cylinder supporting plate carried by said standard, cylinders carried by said cylinder supporting plate, pistons working within said cylinders, means for holding one end of said pistons and permitting the rotation of said cylinders and pistons, means for controlling the admission and exhaust of gases to and from said cylinders, and means for igniting gases within said cylinders.

3. An engine of the class described comprising a base, a cylinder supporting plate carried thereby, a plurality of cylinders carried by said cylinder supporting plate, said cylinder supporting plate provided with a depending flange constituting a section of a friction clutch, a starting gear supported below said cylinder supporting plate, a flange carried by said starting gear and constituting a portion of a friction clutch, and means for driving said starting gear.

4. An engine of the class described comprising a base, a cylinder supporting plate carried thereby, a plurality of cylinders carried by said cylinder supporting plate, said cylinder supporting plate provided with a depending flange constituting a section of a friction clutch, a starting gear supported below said cylinder supporting plate, a flange carried by said starting gear and constituting a portion of a friction clutch, means for driving said starting gear, a friction band engaging the sections of the friction clutch carried by said cylinder supporting plate and said gear, and means for throwing said band into and out of an operative position.

5. An engine of the class described comprising a base, a cylinder supporting plate carried thereby, a plurality of cylinders carried by said cylinder supporting plate, said cylinder supporting plate provided with a depending flange constituting a section of a friction clutch, a starting gear supported below said cylinder supporting plate, a flange carried by said starting gear and constituting a portion of a friction clutch, means for driving said starting gear, a friction band engaging the sections of the friction clutch carried by said cylinder supporting plate and said gear, means for yieldably forcing said clutch band vertically for holding the same in an operative position, an operating lever, means for raising and lowering one end of said operating lever, shoes carried by said operating lever, said band provided with a laterally-extending flange, said shoes fitting over said flange and adapted to move said band into and out of an operative position.

6. An engine of the class described comprising a base, a cylinder supporting plate rotatably mounted upon said base, a crank pin stationarily supported upon said base, a plurality of cylinders carried by said plate, a piston working in each of said cylinders, a piston rod connected to each piston, each piston rod provided with a shoe at one end thereof for engaging said crank pin, a retaining collar passing around said shoes and holding the same in engagement with said crank pin, means for controlling the admission and exhaust of gases to and from said cylinders, means for igniting gases within said cylinders, a retaining plate carried by said crank pin, and overhanging said shoes for retaining said shoes against vertical movement upon said crank pin, said retaining plate provided with lubricating apertures formed therein, and a lubricating housing fitting over said plate and adapted to supply lubricant through said apertures in said retaining plate.

7. An engine of the class described comprising a base, a plurality of cylinders adapted to rotate upon said base, each cylinder provided with a plurality of valves for controlling the admission and exhaust of gases to and from the cylinders, an operating gear coöperating with said valves for opening and closing the same at predetermined intervals, a tripping member adjustably mounted upon said base for engaging said gear and rotating the same at predetermined intervals, and a circuit closing arm adjustably mounted upon said base for closing a circuit through the spark plug in said cylinders and controlling the ignition of gases within said cylinders.

8. An engine of the class described comprising a base, a plurality of cylinders adapted to rotate upon said base, each cylinder provided with a plurality of valves for controlling the admission and exhaust of gases to and from the cylinders, an operating gear coöperating with said valves for opening and closing the same at predetermined intervals, a tripping member adjustably mounted upon said base for engaging said gear and rotating the same at predetermined intervals, a circuit closing arm adjustably mounted upon said base for closing a circuit through the spark plug in said cylinders and controlling the ignition of gases within said cylinders, track-ways carried by said base, said circuit closing arm and tripping arm provided with shoes working in said track-ways for permitting the adjustment of said circuit closing arm and tripping arm to a desired position, and means for shifting said arms.

9. An engine of the class described comprising a base, a plurality of cylinders adapted to rotate upon said base, means carried at one end of said cylinder for controlling the admission and exhaust of gases to and from said cylinder, and tripping means spaced diametrically opposite to each other for controlling the alternate admission and exhaust of gases to and from said cylinders.

In testimony whereof I hereunto affix my signature.

CHARLES E. SANBORN.

Copies of this patent may be obtained for five cents each, by addressing the "Commissioner of Patents, Washington, D. C."